United States Patent
Giese et al.

(10) Patent No.: US 9,797,417 B2
(45) Date of Patent: Oct. 24, 2017

(54) MASTER BRAKE CYLINDER ARRANGEMENT WITH ACTUATION DETECTION FOR A MOTOR VEHICLE BRAKE SYSTEM

(71) Applicant: Lucas Automotive GmbH, Koblenz (DE)

(72) Inventors: Hans-Martin Giese, Polch (DE); Torsten Petry, Koblenz (DE); David Lopéz Larequi, Koblenz (DE)

(73) Assignee: LUCAS AUTOMOTIVE GMBH, Koblenz (DE)

( * ) Notice: Subject to any disclaimer, the term of this patent is extended or adjusted under 35 U.S.C. 154(b) by 395 days.

(21) Appl. No.: 14/443,469

(22) PCT Filed: Nov. 14, 2013

(86) PCT No.: PCT/EP2013/073847
§ 371 (c)(1),
(2) Date: May 18, 2015

(87) PCT Pub. No.: WO2014/076190
PCT Pub. Date: May 22, 2014

(65) Prior Publication Data
US 2015/0316081 A1 Nov. 5, 2015

(30) Foreign Application Priority Data
Nov. 16, 2012 (DE) .......................... 10 2012 022 519

(51) Int. Cl.
*F15B 15/28* (2006.01)
*B60T 17/22* (2006.01)
(Continued)

(52) U.S. Cl.
CPC .......... *F15B 15/2861* (2013.01); *B60T 7/042* (2013.01); *B60T 11/16* (2013.01);
(Continued)

(58) Field of Classification Search
CPC .......... B60T 7/042; B60T 11/16; B60T 11/18; B60T 11/20; F15B 15/28; F15B 15/2815;
(Continued)

(56) References Cited

U.S. PATENT DOCUMENTS

| 4,824,186 A | 4/1989 | Leiber et al. |
| 5,098,171 A | 3/1992 | Siegel |

(Continued)

FOREIGN PATENT DOCUMENTS

| DE | 3723916 A1 | 1/1989 |
| DE | 3723842 A1 | 2/1989 |

(Continued)

OTHER PUBLICATIONS

PCT International Search Report and Written Opinion, Application No. PCT/EP2013/073847, dated Jul. 7, 2014.

*Primary Examiner* — Logan Kraft
(74) *Attorney, Agent, or Firm* — MacMillan, Sobanski & Todd, LLC (57) ABSTRACT

The invention relates to a master brake cylinder arrangement with actuation detection for a motor vehicle braking system, having at least one piston arrangement with a piston, which is movably guided in a cylinder bore in a cylinder housing, said piston with the cylinder bore defining a pressure chamber which is fluidically coupled to a hydraulic brake circuit. During a forward stroke, the piston can be moved from a start position into a possible actuation piston along a movement axis, which coincides essentially with a longitudinal axis of the cylinder bore, and during a return stroke, said piston is moved from an actuation position into a start position. The piston is associated with a coupling element which is coupled to a position detecting rod for common movement therewith, said position detecting rod being moved essentially parallel to the first cylinder bore, the position of the position detecting rod can be detected by (Continued)

means of a position detecting sensor placed on the cylinder housing. According to the invention, in order to save space, the coupling element can be locked relative to the piston for a common lift movement therewith and after exceeding a predetermined path of the lift movement, the piston can be moved further relative to the coupling element.

15 Claims, 10 Drawing Sheets

(51) Int. Cl.
  *B60T 7/04* (2006.01)
  *B60T 11/16* (2006.01)
  *B60T 11/18* (2006.01)
  *B60T 11/20* (2006.01)
  *G01B 5/00* (2006.01)

(52) U.S. Cl.
  CPC .............. *B60T 11/18* (2013.01); *B60T 11/20* (2013.01); *B60T 17/22* (2013.01); *F15B 15/2892* (2013.01); *G01B 5/0028* (2013.01); *F16D 2500/3101* (2013.01)

(58) Field of Classification Search
  CPC .............. F15B 15/2861; F15B 15/2892; F16D 2500/3101; F16D 2500/31426; G01B 5/0028

See application file for complete search history.

(56) References Cited

U.S. PATENT DOCUMENTS

| | | | |
|---|---|---|---|
| 2007/0182403 A1* | 8/2007 | von Hayn | B60T 7/042 324/207.24 |
| 2013/0205881 A1 | 8/2013 | Naether et al. | |

FOREIGN PATENT DOCUMENTS

| | | |
|---|---|---|
| DE | 3842225 A1 | 6/1990 |
| DE | 102004014808 A1 | 11/2004 |
| DE | 102008020934 A1 | 10/2009 |
| DE | 102009011807 A1 | 10/2009 |
| DE | 102010027308 A1 | 1/2012 |

\* cited by examiner

MASTER BRAKE CYLINDER ARRANGEMENT WITH ACTUATION DETECTION FOR A MOTOR VEHICLE BRAKE SYSTEM

CROSS-REFERENCE TO RELATED APPLICATIONS

This application is a national stage of International Application No. PCT/EP2013/073847 filed Nov. 14, 2013 and which claimed priority to German Patent Application No. 10 2012 022 519.9 filed Nov. 16, 2012, the disclosures of which are incorporated herein by reference in their entirety.

BACKGROUND OF THE INVENTION

The present invention relates to a master brake cylinder arrangement with actuation detection for a motor vehicle braking system with at least one piston arrangement with a piston which is dislocatably guided in a cylinder bore in a cylinder housing, wherein the piston confines a pressure chamber with the cylinder bore which is fluidically coupled with a hydraulic brake circuit, and can be dislocated during a forward stroke from an initial position to a possible actuated position along a dislocation axis which substantially coincides with a longitudinal axis of the cylinder bore, and is dislocated from an actuated position to the initial position during a back stroke, wherein a coupling element is assigned to the piston which is coupled for a common dislocation to a position detection rod which is dislocatably guided substantially in parallel to the first cylinder bore, wherein the position of the position detection rod is detectable with a position detection sensor attached to the cylinder housing. The present invention further relates to a motor vehicle braking system with such a master brake cylinder arrangement.

A master brake cylinder arrangement of the kind described at the outset is already known from the prior art according to the document DE 10 2008 020 934 A1. In this arrangement it is provided that the position detection rod is fixedly coupled to the piston and moves with the piston over the entire stroke movement thereof. This has the result that a corresponding space-requiring arrangement must be provided on the master brake cylinder housing, which arrangement has a sufficiently long position detection rod with sufficient freedom of movement corresponding to the stroke movement of the piston. The cylinder housing must be configured with a correspondingly large volume. However, this requirement is contrary to the increasingly important requirement for space- and weight-saving components in modern motor-vehicle construction.

Similar arrangements are found in the documents DE 37 23 842 A1, DE 37 23 916 A1 and DE 38 42 225 A1.

BRIEF SUMMARY OF THE INVENTION

A feature of the present invention is to provide a master brake cylinder arrangement of the kind described at the outset which differs from the prior art by having a compact and cost-effective design together with reliable functioning.

This feature is achieved by a master brake cylinder arrangement in which it is provided that the coupling element is lockable relative to the piston for a common stroke movement therewith and after over-travelling of a predetermined distance of the stroke movement, the piston is further dislocatable relative to the coupling element.

In a departure from the prior art, the present invention provides that the coupling element, which is coupled or couplable for common dislocation to the position detection rod, does not move jointly over the entire stroke movement of the piston, but only over a partial region of this stroke movement. For this partial region, the coupling element is coupled to the piston by locking for common dislocation. If, however, the predetermined distance of the stroke movement is reached and over-travelled, the coupling element is so to speak uncoupled from the piston. The piston then moves further without taking along the coupling element. Accordingly, the position detection rod is not moved further either. As a result, the movement range for the latter can be dimensioned significantly smaller. At first sight, this may appear disadvantageous. However, it has been realised that, both for the generation of a brake light signal and for the control of traction control systems, it is not necessary to detect the entire stroke movement of the piston. Rather, it is sufficient to monitor only a partial region of the stroke movement of the piston, namely in particular the stroke movement of the piston at the beginning between an initial position, in which the piston is unactuated, and a predetermined piston travel, at which a substantial braking effect has already occurred. The invention makes use of this realization, whereby space and weight can be saved.

A development of the invention provides that the coupling element is assigned a first abutment surface of the piston, of the cylinder housing or of a component coupled thereto, against which surface the coupling element in the initial position abuts or is supported. As a result, it can be ensured that the coupling element with an unactuated brake is in a defined initial position, so that the unactuated state of the brake is also reliably detectable via the position detection rod.

Furthermore, according to the invention it can be provided the coupling element is assigned a second abutment surface, against which the coupling element abuts on over-travelling of the predetermined distance of the stroke movement. As a result, it is ensured that the coupling element after over-travelling of the predetermined distance of the stroke movement is not moved further, but remains, relative to the cylinder housing, in a predetermined position until a back stroke movement of the piston.

Preferably, in this connection it can be provided that the first or/and the second abutment surface is part of an integrally formed section of the cylinder housing. Alternatively to this it is possible that the first or/and the second abutment surface is provided on an additional element formed in the cylinder housing, wherein the additional element is configured in particular in the form of a disc surrounding the piston in the circumferential direction or of an annular sealing component. The use of an additional element allows resort to be had to conventional designs of the cylinder housing and these to be modified only slightly, if possible at all. Moreover, the production and the assembly are thereby facilitated.

An embodiment of the invention provides that the coupling element is a body at least partially encompassing the piston in the circumferential direction. In this case, it is possible according to the invention that the coupling element has an abutment ring which is provided with an abutment surface, via which it engages on the piston. This abutment ring can be closed or slotted. The abutment surface can, for example, be formed by the inner circumferential surface of a tubular section which is integrally connected to the coupling element. Furthermore, an embodiment variant of the invention provides that the coupling element abuts against the piston under radial bias and is coupled to the piston by frictional engagement. In order to ensure that within a predetermined distance of the stroke movement of the piston a common movement between coupling element and piston takes place, additional measures for guaranteeing the frictional engagement over the service life of the master brake cylinder arrangement are taken. In this case, it can in particular be provided that the abutment surface is provided with a special friction lining.

Additionally or alternatively to a frictional engagement, it is further possible that the coupling element is coupled via at least one spring element for common movement with the piston. Thus, for example an arrangement can be employed, with which the coupling element is biased via the spring element in such a way that the coupling element executes a common movement with the piston until it strikes a stop and then is impeded from a further movement together with the piston. In this case, it can be provided that owing to the further movement of the piston the spring element is compressed, as explained in detail below. Alternatively, it is possible that until the over-travelling of the predetermined distance x the spring element relaxes and then has a constant length. In this connection, it is possible in an embodiment variant of the invention that the coupling element is biased via the spring element into an initial position relative to the piston and in this case in particular is of pot-like configuration. Furthermore, in this connection it can be provided that the coupling element has a stop ring, with which it can be brought, owing to the stroke movement of the piston, into abutment against the cylinder housing on over-travelling of the predetermined distance of the stroke movement, wherein the coupling element on advancing stroke movement of the piston, in particular under the action of the spring element, remains stationary relative to the cylinder housing.

An alternative embodiment of the invention provides that the spring element is supported, at one end, on the coupling element and, at the other end, on a holding bush fixed to the piston or a closure element fixed to the cylinder housing. In this case, the holding bush can be integrally formed on the piston. Preferably, however, it is provided that the holding bush is formed as a separate component and fixed to the piston, for instance by latching or via additional fixing means. This too facilitates the production and the assembly, because in this way the piston can, for example, firstly be preassembled with the coupling element and the holding bush and also the spring element arranged therebetween to form an assembly and subsequently be inserted into the master brake cylinder housing. In the case of a supporting of the spring element on a closure element fixed to the cylinder housing, the coupling element can, according to a further embodiment of the invention, be supported on a diameter step or shoulder of the piston. As a result, the coupling element can, solely via the spring element and the abutment surfaces on piston and closure element, be completely fixed in its position over its entire movement distance. Regarding the position detection device, a development of the invention provides that the guide shaft is configured with a diameter step, wherein the position detection rod has a detection section or is coupled thereto, on which a sensor element is provided. Furthermore, in this connection it is possible that the sensor element has a magnetic body and that the position detection sensor is a Hall sensor.

The invention further relates to a motor vehicle braking system with a master brake cylinder arrangement of the kind described above.

Other advantages of this invention will become apparent to those skilled in the art from the following detailed description of the preferred embodiments, when read in light of the accompanying drawings.

DETAILED DESCRIPTION OF THE INVENTION

Figure 1:
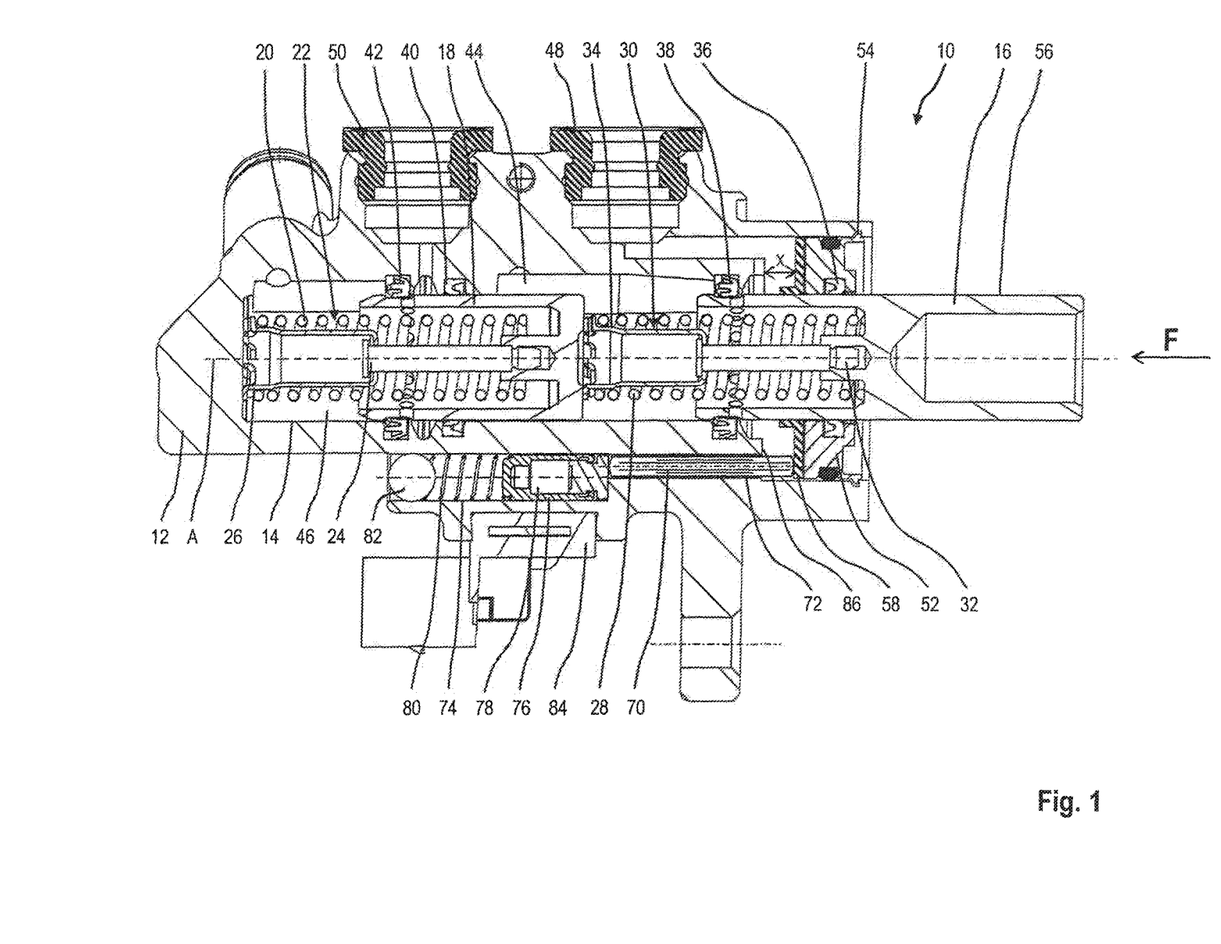
FIG. 1 shows an axis-containing sectional view of a first embodiment of the master brake cylinder arrangement according to the invention in an initial position.

In FIG. 1, a master brake cylinder arrangement according to the invention is shown and generally designated by 10 in a sectional view containing the longitudinal axis A of the cylinder bore. This arrangement comprises a cylinder housing 12, in which a cylinder bore 14 is provided. A piston arrangement with a first piston 16 and a second piston 18 is accommodated in the cylinder bore 14. The second piston 18 is supported on the base of the cylinder bore 14 via a return spring 20. The return spring 20 is biased via a biasing device 22 with a pin 24 and a bush 26. The first piston 16 is supported on the second piston 18 via a further return spring 28, which is provided via a further biasing device 30 with a pin 32 and a bush 34. The two pistons 16 and 18 are guided in a sealed manner in the cylinder bore 14 using seals 36, 38, 40, 42, so that they enclose with the cylinder bore 14 pressure chambers 44, 46. These pressure chambers 44, 46 are hydraulically coupled with a hydraulic circuit (not shown) of a motor vehicle braking system. Furthermore, there can be seen connections 48, 50 for connecting a fluid container (not shown) in a known manner.

The seal 36 is accommodated in a separate closure element 52 which is received in the cylinder housing 12 by a caulking or a latching connection 54. The piston 16 is also guided in this element.

Figure 6:
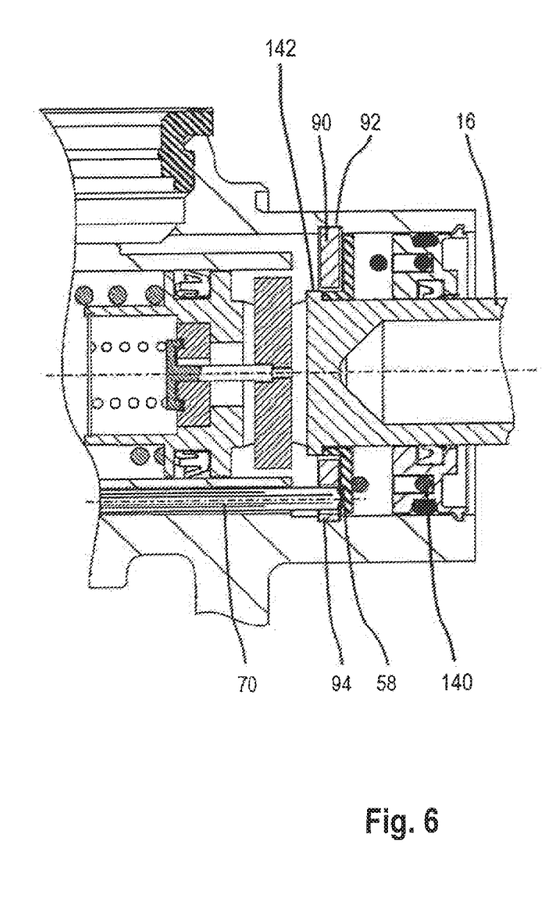
FIG. 6 shows a partial sectional view corresponding to FIG. 5 of the third embodiment of the invention in the initial position.

On the outer circumferential surface 56 of the piston 16 is mounted a coupling element 58, which is shown in FIG. 6 in a three-dimensional single-part representation. This element has a slotted, annular body with a tubular section 60 running in the direction of the longitudinal axis A and an annular section 62 running in the radial direction. Provided on both sides of the slot 64 are spreading openings 66 for facilitating the mounting with a spreading tool. The inner circumferential surface 68 of the tubular section 60 is formed as a friction surface, optionally with a friction lining.

The coupling element 58 is seated under radial bias on the outer circumferential surface 56 of the first piston 16. In the initial position shown in FIG. 1, it abuts in a planar manner against the surface of the closure element 52 facing the interior of the cylinder housing 12. The coupling element 58 acts, with a place on its annular section 62, on a position detection rod 70 which is guided in a guide shaft 72 inside the cylinder housing 12. At its end facing away from the coupling element 58, the position detection rod 70 is coupled to a sensor element 76, displaceably accommodated in a bore 74, with a magnetic body 78. The sensor element 76 is biased via a compression spring 80 into its position shown in FIG. 1. The bore 74 is closed via a spherical closure body 82. Furthermore, it can be seen that on the cylinder housing 12 there is provided a position detection sensor 84 which delivers a position signal to the vehicle electronics according to the deflection of the sensor element 76.

If now from the initial position according to FIG. 1 the master brake cylinder arrangement 10 is actuated via a brake pedal (not shown), a force F is exerted on the first piston 16 and the latter is dislocated along the longitudinal axis A into the cylinder housing 12 to generate a brake pressure. On account of the frictional engagement between the first piston 16 and the coupling element 58, the coupling element 58 moves with the first piston 16. Owing to the movement of the coupling element 58, the position detection rod 70 is also dislocated and with the latter the sensor element 76, for position detection.

Figure 2:
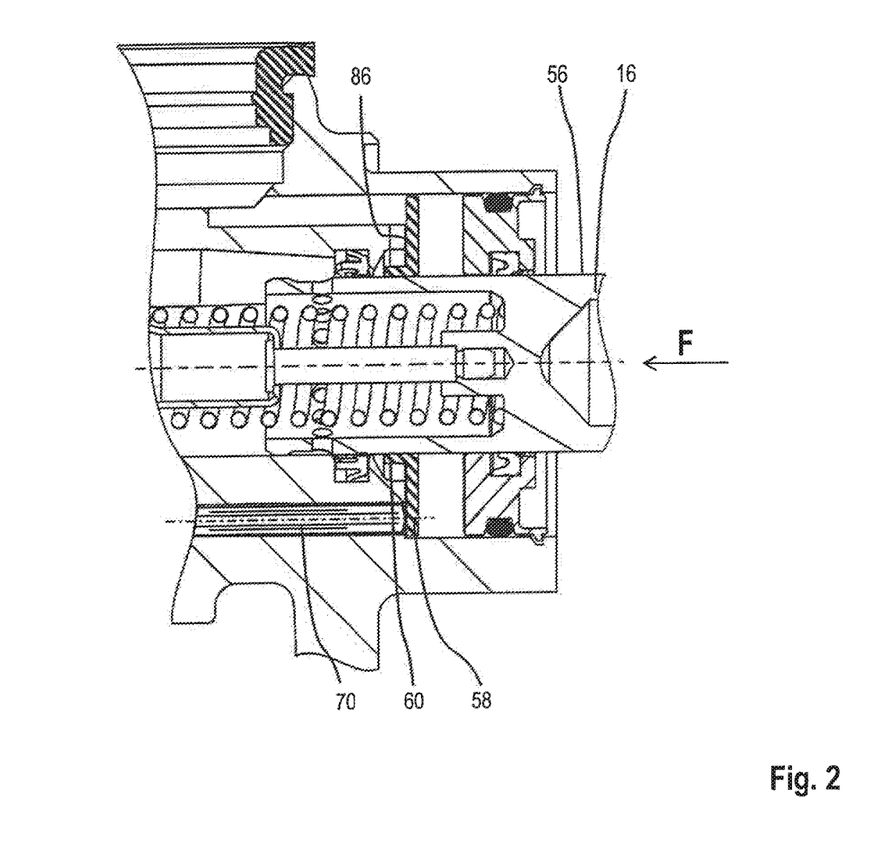
FIG. 2 shows a partial sectional view of the embodiment according to FIG. 1 in an actuated position.

However, as soon as the first piston 16 has been dislocated by a predetermined distance x, the coupling element 58 abuts against an abutment projection 86 of the master brake cylinder housing 12. This state is shown in FIG. 2. A further movement of the coupling element 58 with the first piston 16 is no longer possible because of this mutual abutment. However, if the piston 16 is further dislocated as a result of the force F, this piston, with its outer circumferential surface 56, so to speak slips through the tubular section 60, bearing on this surface under bias, of the coupling element 58. Accordingly, any further dislocation of the piston 16 is no longer detected via the position detection rod 70 and the position detection sensor 84.

If the brake pedal is subsequently released, the first and the second piston 16, 18 move back due to the action of the return springs 20, 28. In the process, the coupling element 58 is carried along with the piston on account of the frictional engagement between the inner circumferential surface 68 of the tubular section 60 and the outer circumferential surface 56 of the first piston 16, until the coupling element 58 abuts against the closure element 52 again. The coupling element 58 cannot follow a further return movement of the piston 16 because of this abutment situation, so that the piston 16 once again slips through the coupling element 58 by overcoming the frictional engagement. Finally, the initial position according to FIG. 1 is reached again, so that upon a renewed actuation of the brake the same conditions and relative positions regarding the position detection arise as described above. It follows from this that the intended switching point for a brake light signal is always reproducible, because the coupling element 58 always returns to its originally provided initial position.

The invention is distinguished in that the position detection no longer extends over the complete piston stroke but only over a partial region, designated above as distance x. The position detection in this partial region is sufficient on the one hand to generate the brake light signal and on the other hand to carry out appropriate control measures on traction control systems or the like. A detection of the complete piston stroke is not necessary, as has been realised by the inventors. As a result, the master brake cylinder arrangement according to the invention can be of considerably more compact and also lighter design than conventional devices, in which the complete piston stroke is detected during its stroke movement.

Figure 3:
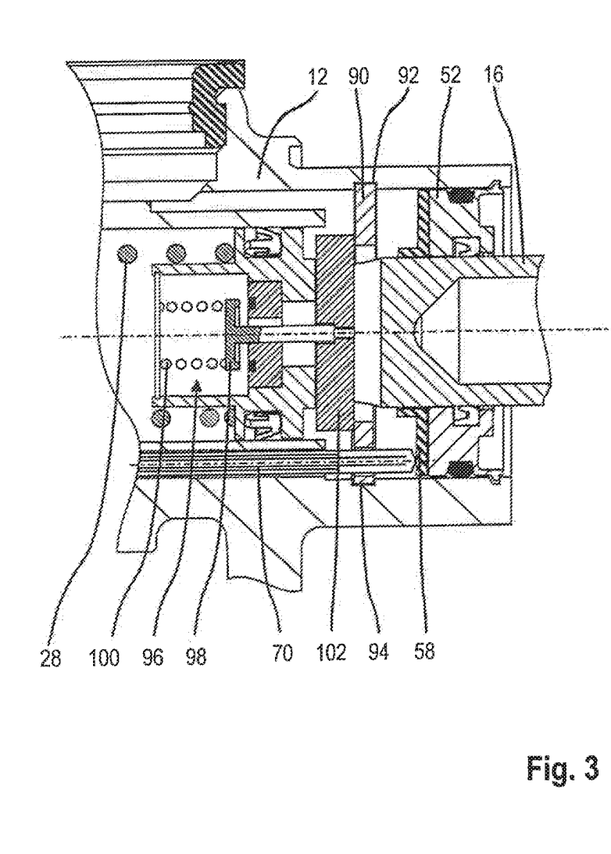
FIG. 3 shows a partial sectional view corresponding to FIG. 2 of a second embodiment of the invention in the initial position.
Figure 4:
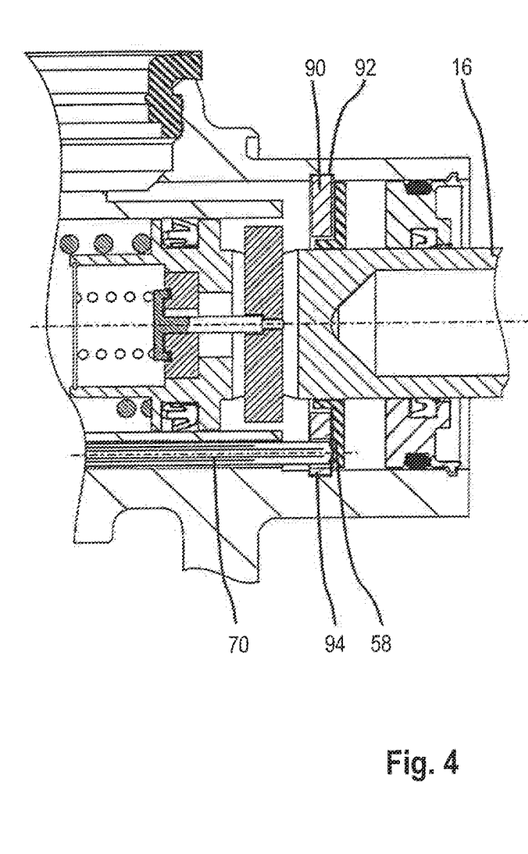
FIG. 4 shows a partial sectional view corresponding to FIG. 3 of the second embodiment of the invention in an actuated position.

FIGS. 3 and 4 show a second embodiment of the invention, wherein, to avoid repetitions and to facilitate the description, for components which have the same effect or are of the same kind, the same reference symbols are used as in the description of the first embodiment. Once again, the initial position and an actuated position are shown.

An essential difference of this embodiment from the first embodiment consists in that the coupling element 58 no longer abuts against an abutment formed integrally with the cylinder housing 12, but against a disc-shaped component 90 which is inserted into an accommodating groove 92 in the cylinder housing 12. This component also has a guide bore 94 for guiding the position detection rod 70. A further difference of this embodiment from the first embodiment consists in that the piston is provided with a central valve 96 which is formed with a valve tappet 98 in a manner known per se. The valve tappet 98 can be opened or closed against the action of a compression spring 100 depending on the position of a locking bar 102. In the initial position, the valve 96 is open, so that there is a fluid connection to the fluid container. As soon as the first piston 16 is deflected by a specific distance, the locking bar 102 lifts off from the disc 90 and the central valve 96 changes into its closed state.

The from functioning regarding the position detection is the same as described above with reference to the first embodiment.

Figure 5:
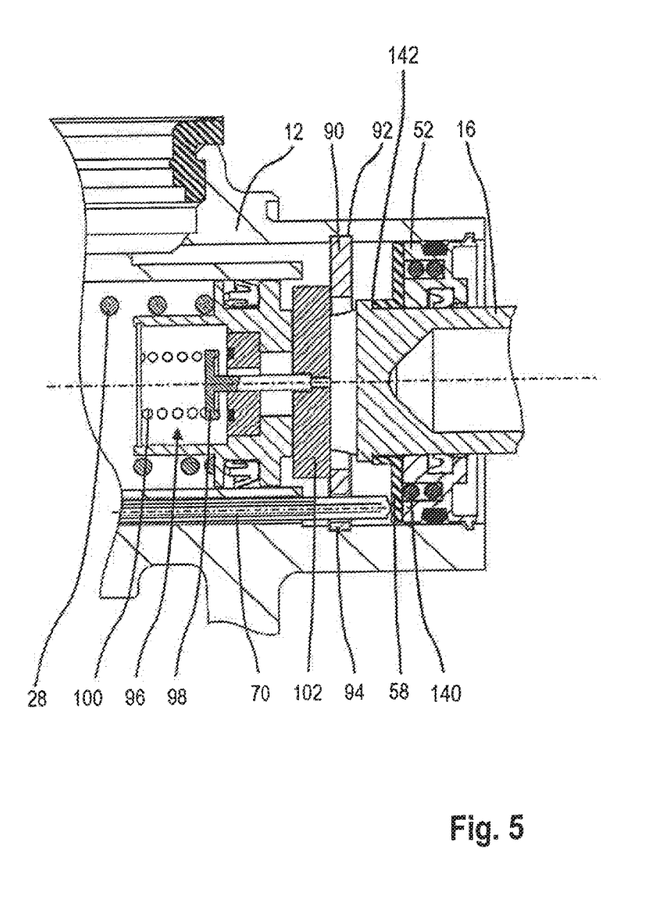
FIG. 5 shows a partial sectional view corresponding to FIG. 3 of a third embodiment of the invention in the initial position.

In FIGS. 5 and 6, a modification of the embodiment according to FIGS. 3 and 4 is shown. Once again, an initial position and an actuated position are illustrated. An essential difference from the embodiment according to FIGS. 3 and 4 is the provision of a diameter step 142 on the piston 16. The encircling end surface defined by the diameter step 142 and facing away from the base of the cylinder bore 14 serves as an abutment surface for the coupling element 58. A compression spring 140 is arranged between the coupling element 58 and the closure element 52 fixed to the housing. In the initial position shown in FIG. 5, the compression spring 140 is maximally compressed and biases the coupling element 58 against the diameter step 142. Analogously to the embodiment according to FIGS. 3 and 4, the coupling element after over-travelling of the predetermined distance abuts against a disc-shaped component 90, with the compression spring 140 not yet being completely relaxed. In this case, the compression spring 140 abuts against the coupling element 58 over the entire movement distance thereof and finally biases the latter also against the disc 90. The embodiment affords the advantage that the position of the coupling element 58 is always uniquely defined solely by a cooperation of the compression spring 140 and the abutment surfaces formed from diameter step 142 and disc 90. A radial bias of the coupling element 58 against the piston 16 can therefore be of less strong design or be completely omitted. This simplifies the assembly and reduces friction losses.

Figure 7:
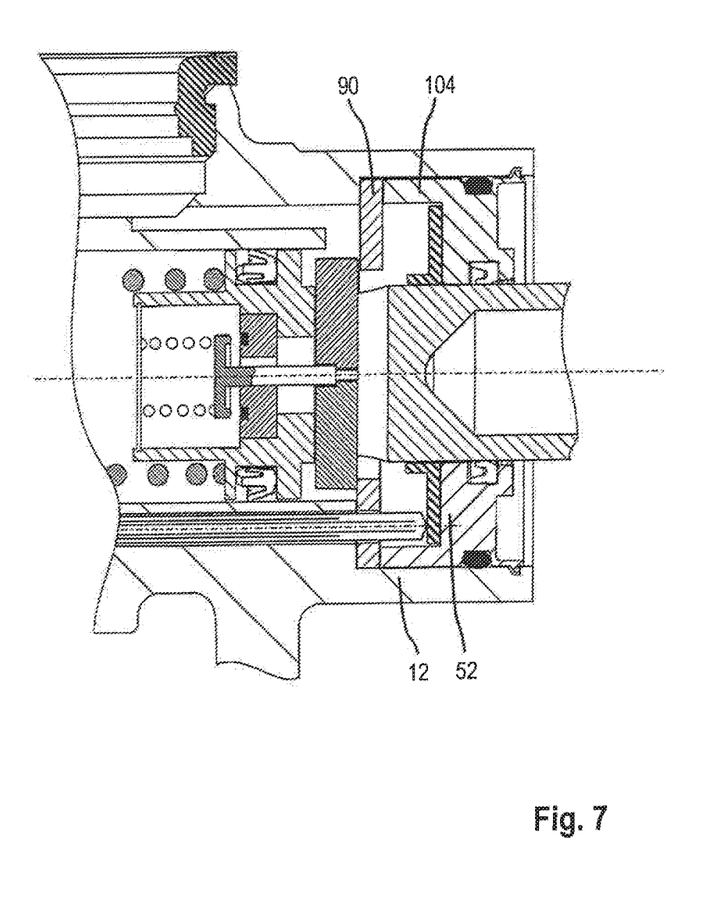
FIG. 7 shows a partial sectional view corresponding to FIG. 3 of a fourth embodiment of the invention in the initial position.
Figure 8:
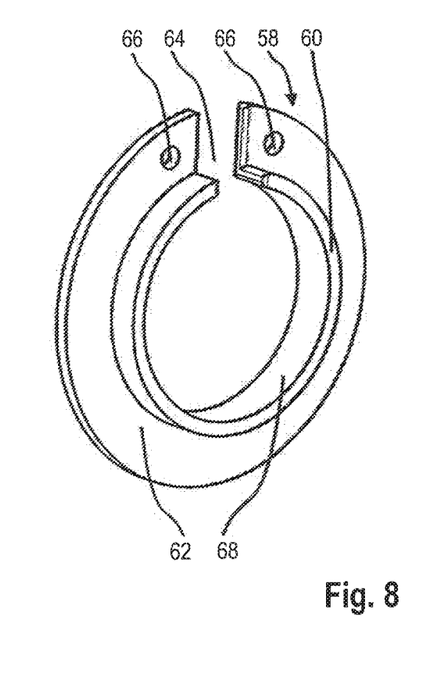
FIG. 8 shows a three-dimensional representation of an embodiment of the coupling element.

FIG. 7 shows a further modification of the embodiment according to FIGS. 3 and 4. The only difference of this embodiment consists in that the disc 90 is not accommodated in an accommodating groove, but that the closure element 52 is provided with an axial extension 104 which fixes the disc 90 in the cylinder housing 12.

Figure 9:
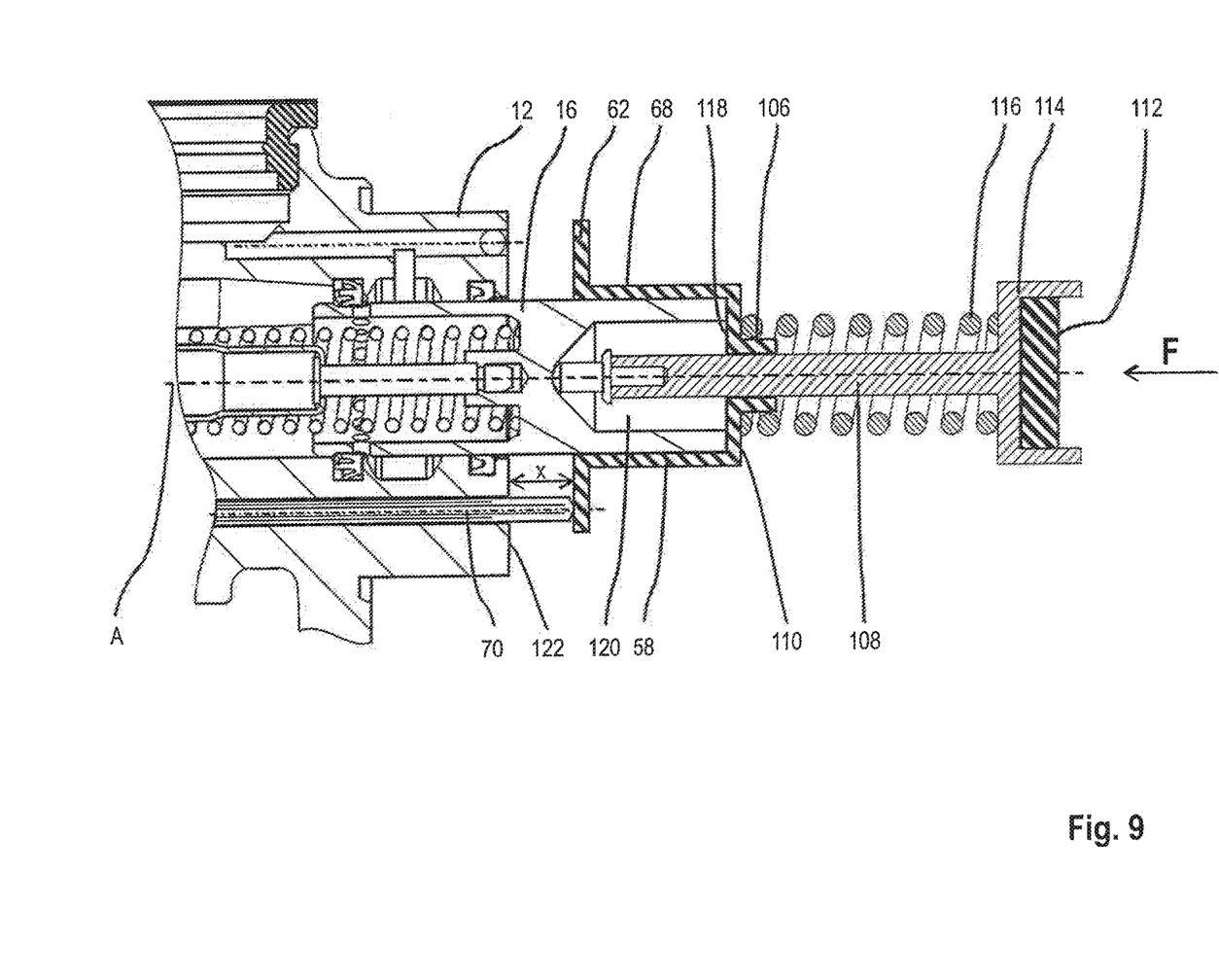
FIG. 9 shows a partial sectional view corresponding to FIG. 2 of a fifth embodiment of the invention in the initial position.
Figure 10:
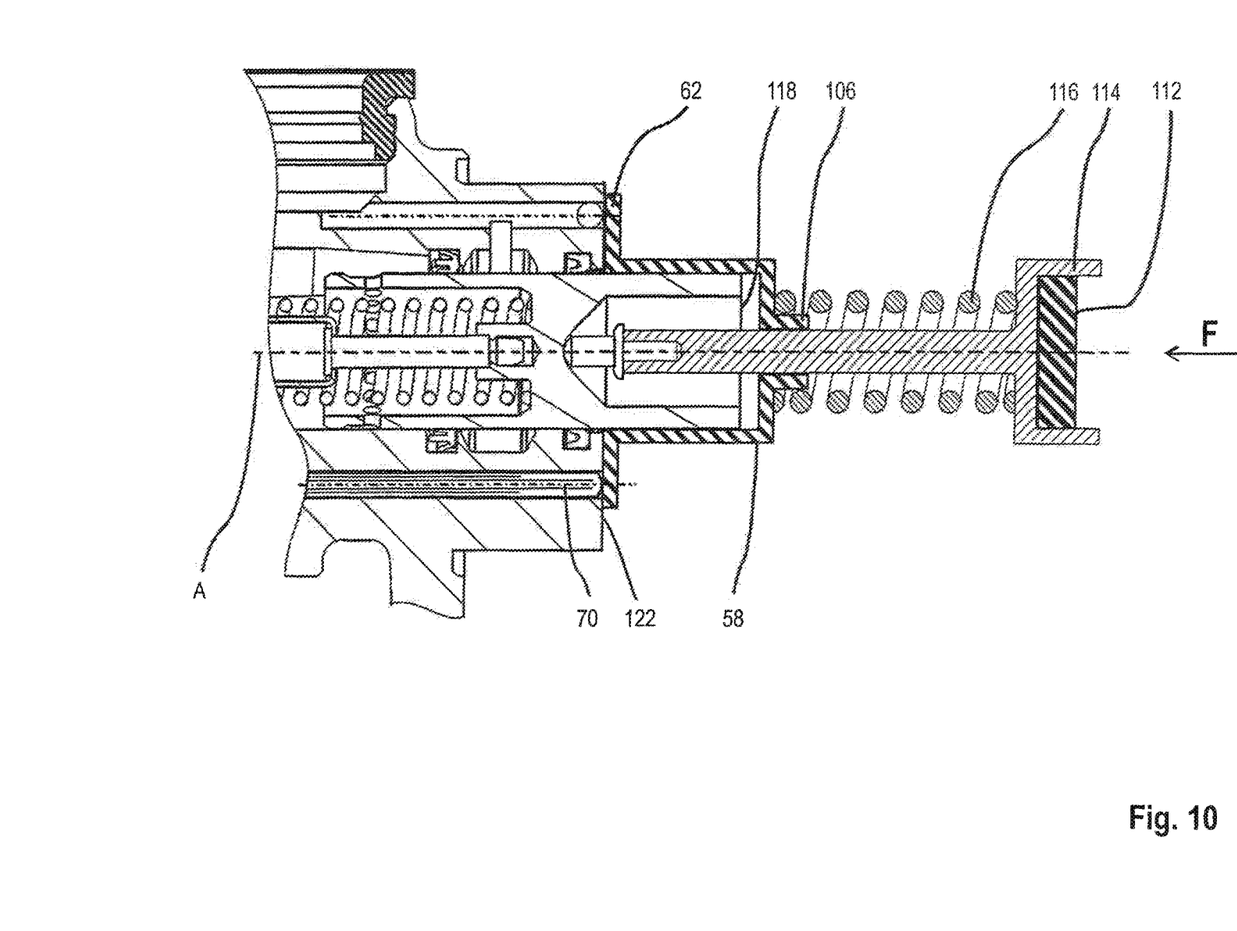
FIG. 10 shows a partial sectional view corresponding to FIG. 9 of the fifth embodiment of the invention in an actuated position.

FIGS. 9 and 10 show a fifth embodiment of the invention, wherein, to avoid repetitions and to facilitate the description, for components which have the same effect or are of the same kind, the same reference symbols are used as in the above description of the preceding embodiment. Once again, the initial position (FIG. 9) and an actuated position (FIG. 10) are shown.

In this fifth embodiment, the position detection rod 70 projects from the cylinder housing 12 in the axial direction A. The coupling element 58 in this embodiment is of pot-like and stepped configuration. It surrounds, on one side, the free right-hand end of the first piston 16 with its annular section 62 and the tubular section 68. Furthermore, it surrounds with a tubular extension 106 a plunger-like force input member 108, this tubular extension 106 being connected to the tubular section 68 via a bottom 110. The force input member 108 is of T-shaped configuration and accommodates in an accommodating section 114 a rubber body 112. Arranged between the accommodating section 114 and the bottom 110 of the coupling element 58 is a compression spring 116 which presses the coupling element 58 into abutment with an end surface 118 at the free end of the first piston 16. It should be noted that the force input member 108 is accommodated in a manner known per se in an accommodating opening 120 of the first piston 16.

Upon an actuation of the brake, the force input member 108 is subjected to the force F. Subsequently, the first piston 16 moves into the cylinder housing 12. The coupling element 58 follows this movement until the predetermined distance x has been travelled. During this movement, the current position of the piston 16 is detected via the position detection rod 70 in the manner described above. When the predetermined distance x has been covered and over-travelled, the coupling element 58 abuts with its annular section 62 against an end surface 122 of the cylinder housing 12 and cannot move further with the piston 16. If the piston is dislocated further into the cylinder housing 12, this piston slips inside the tubular section 68 through the coupling element 58. This can take place under friction. Alternatively, however, a sufficient play can also be provided between coupling element 58 and piston 16 in order to keep the friction too low as possible. In any case, on reaching the predetermined distance x and further piston movement into the cylinder housing 12, a relative movement between the coupling element 58 and the piston 16 occurs, the spring 116 being compressed in accordance with this relative movement. This state is shown by way of example in FIG. 10 for a particular actuated position.

If the brake is released to reduce the braking effect, so that it returns to its initial position again due to the return forces, the coupling element 58 finally assumes the position according to FIG. 9 relative to the piston 16 again due to the action of the compression spring 116.

The embodiment according to FIGS. 9 and 10 has the particular advantage that, apart from the guidance of the position detection rod 70 in the cylinder housing 12, no interventions have to be made on the cylinder housing. The actuation of the position detection rod for position detection takes place solely by measures which are taken outside the cylinder housing. This results in a particularly cost-effective and simple design.

Figure 11:
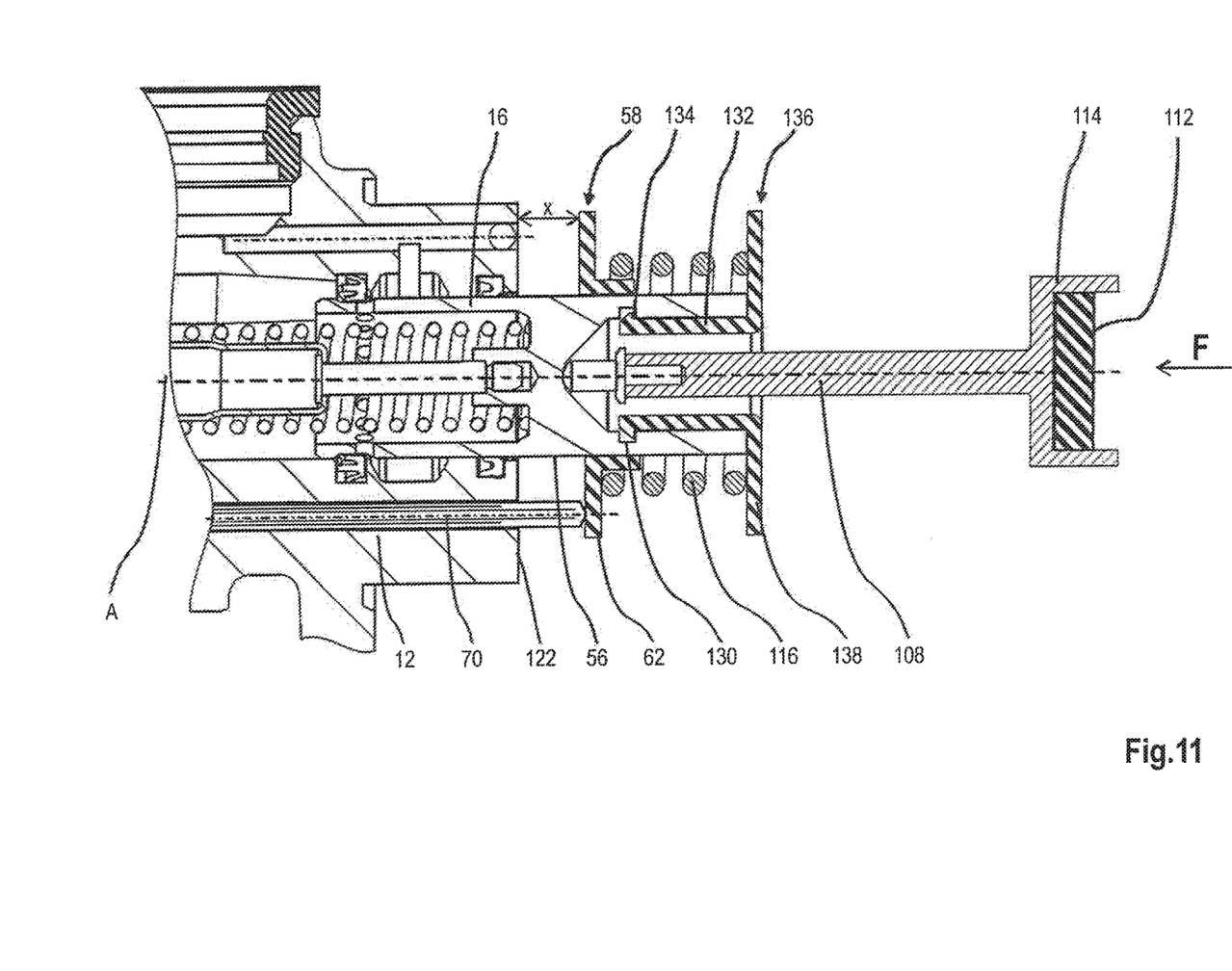
FIG. 11 shows a partial sectional view corresponding to FIG. 2 of a sixth embodiment of the invention in the initial position.
Figure 12:
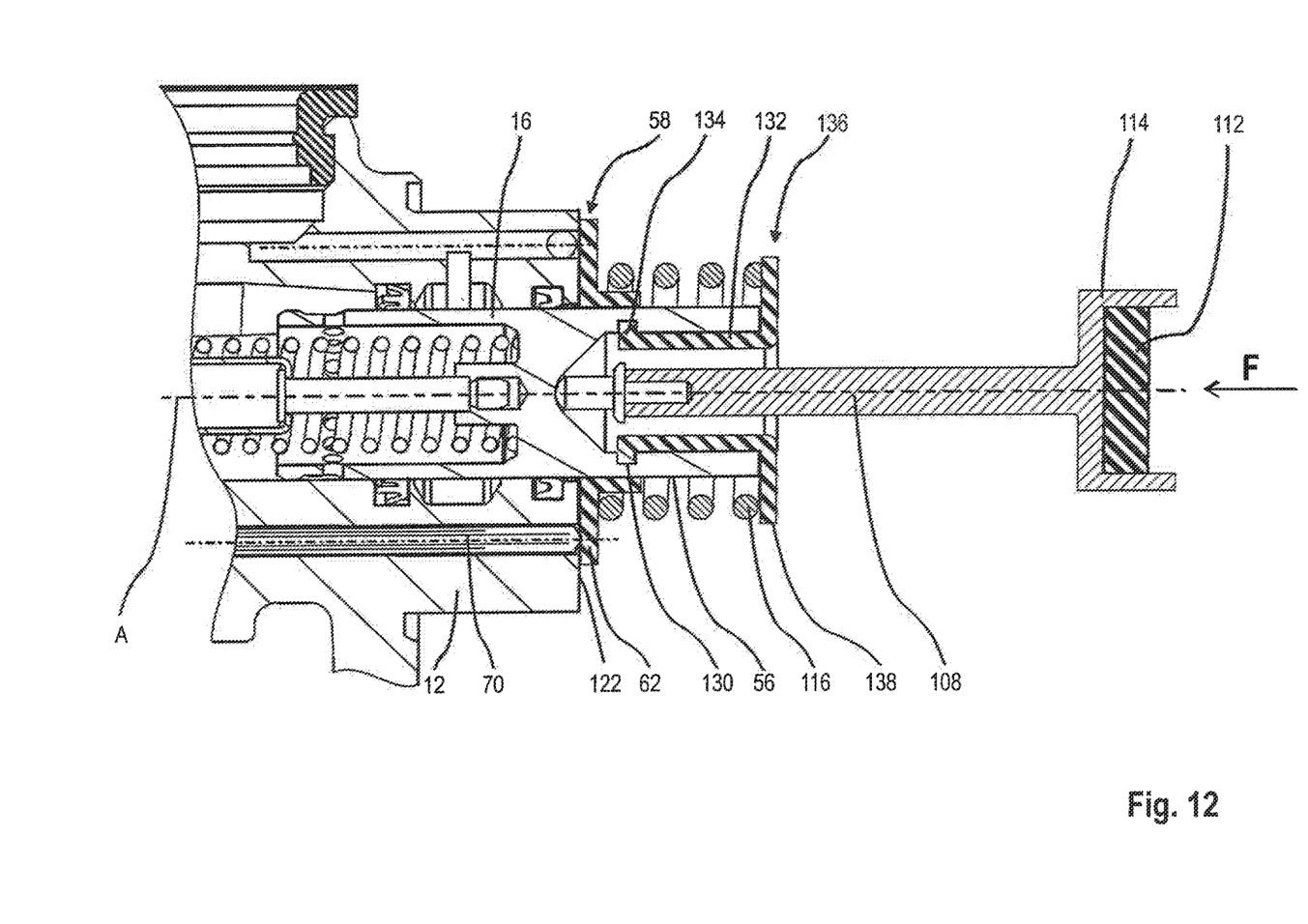
FIG. 12 shows a partial sectional view corresponding to FIG. 11 of the sixth embodiment of the invention in an actuated position.

Finally, FIGS. 11 and 12 show a sixth embodiment of the invention, which is similar to the fifth embodiment of the invention according to FIGS. 9 and 10. In this embodiment, once again the coupling element 58 is accommodated on the outer circumferential surface 56 of the first piston 16, optionally with frictional engagement or with play, i.e. largely without friction. Furthermore, a latching groove 130 is provided in the receiving opening 120. This groove serves to fix a tubular section 132 with latching projections 134 of a holding bush 136 relative to the first piston 16. The holding bush 136 has a disc-shaped annular section 138 which projects in the radial direction with respect to the longitudinal axis A. Provided between the annular section 138 of the holding bush 136 and the annular section 62 of the coupling element 58 is a compression spring 116 which is dimensioned with such a strength that it is not or not substantially compressed as a result of an actuation of the positioning rod 70.

If now once again the force input member 108 is subjected to the force F, the first piston 16 is dislocated in a known manner into the cylinder housing 12. The coupling element 58 follows this movement until the predetermined distance x has been travelled. During this movement, the current position of the piston 16 is detected via the position detection rod 70 in the manner described above. When the predetermined distance x has been covered and over-travelled, the coupling element 58 abuts with its annular section 62 against an end surface 122 of the cylinder housing 12 and cannot move further with the piston 16. If the piston is dislocated further into the cylinder housing 12, this piston slips inside the tubular section 68 through the coupling element 58. In any case, on reaching the predetermined distance x and further piston movement into the cylinder housing 12, a relative movement between the coupling element 58 and the piston 16 occurs, the spring 116 being compressed in accordance with this relative movement. This state is shown by way of example in FIG. 12 for a particular actuated position.

If the brake is released, so that it returns to its initial position again due to the return forces, the coupling element 58 finally assumes the position according to FIG. 11 relative to the piston 16 again due to the action of the compression spring 116.

The embodiment according to FIGS. 11 and 12 is also distinguished by a comparatively simple design. Measures have only to be undertaken on the first piston 16 in order to be able to utilise the above-described advantages of the position detection performed only over a partial region of the stroke movement.

Figure 13:
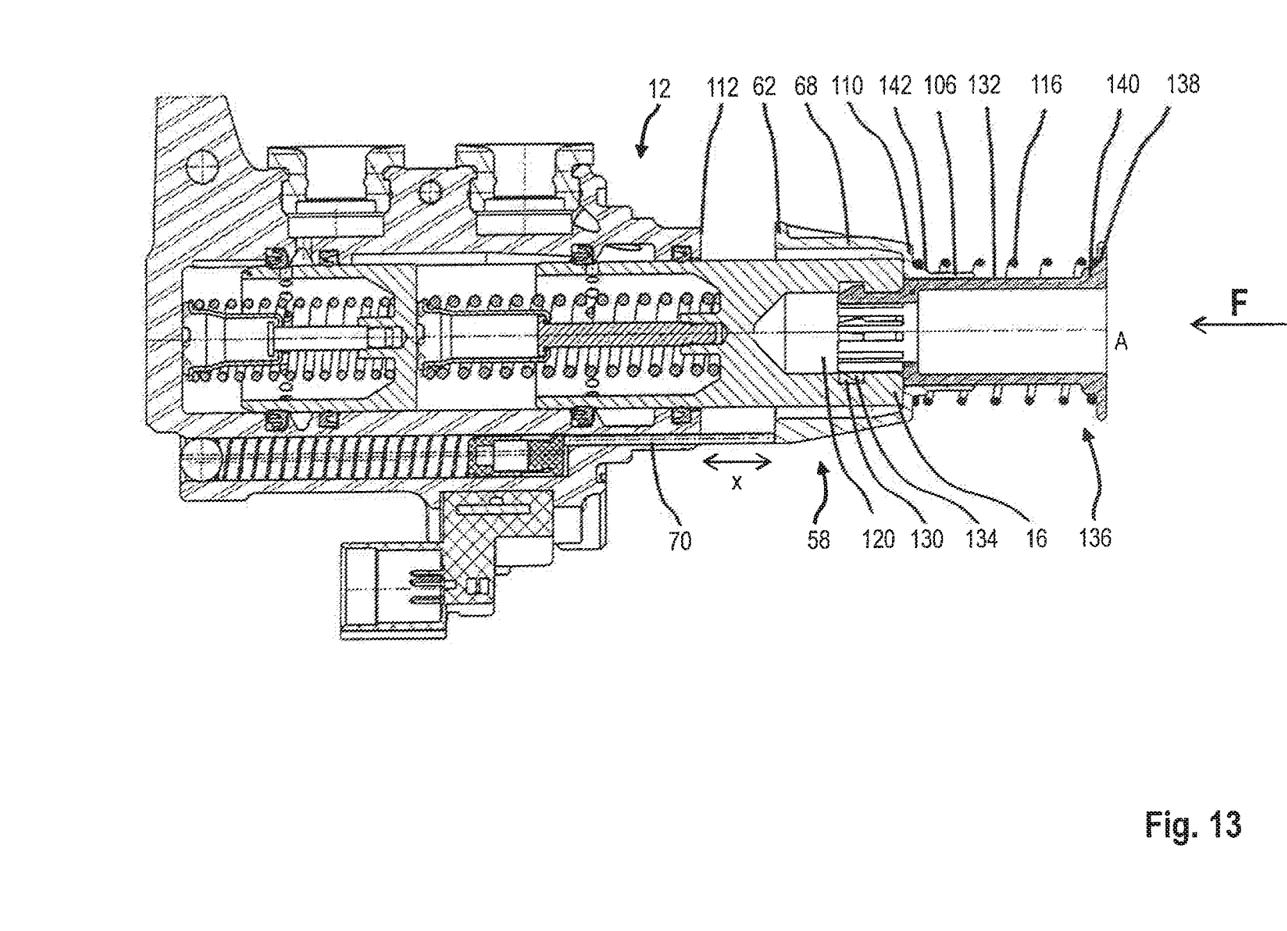
FIG. 13 shows a partial sectional view corresponding to FIG. 2 of a seventh embodiment of the invention in the initial position.

Furthermore, in FIG. 13 there is shown a seventh embodiment, which is based on the fifth and sixth embodiment according to FIGS. 9 and 10, and 11 and 12. In the broadest sense, in this embodiment there is provided a combination of a pot-like coupling element 58 analogously to FIGS. 9 and 10 with a holding bush 136 engaging in the accommodating opening 120 of the piston 16 according to FIGS. 10 and 11. Arranged between these components is once again a compression spring 116. In FIG. 13, the master brake cylinder arrangement 10 is generally in a position where the braking is not active and the piston 16 is positioned in its initial position.

As can be seen from FIG. 13, the coupling element 58 is again configured with an annular section 62, a tubular section 68, a tubular extension 106 and a bottom 110. The holding bush 136, which is preferably made of plastic, once again has a tubular section 132 with latching projections 134 which engage in a latching groove 130 inside the accommodating opening 120. Likewise, an annular section 138 is provided on the right-hand end in FIG. 13, and serves as an abutment surface for the compression spring 116. The fixing of the compression spring 116 to the holding bush 136 takes place, in what is shown, by means of a diameter step 140, onto which the compression spring 116 is pushed with elastic widening. On the coupling element 58, the compression spring 116 abuts against the outer wall of the bottom 110 and is likewise fixed thereto by means of a diameter step 142.

Compared with the sixth embodiment, the tubular section 132 of the holding bush 136 is configured with a markedly larger axial length, so that the annular section 138 is arranged axially spaced from the piston 16. Analogously to the previous examples, an actuating member (not shown) can be fastened in a known manner in the accommodating opening 120 of the piston 16 and extend along the longitudinal axis A through the holding bush 136.

In the embodiment shown, the coupling element 58 sectionally surrounds the tubular section 132 of the holding bush 136 with its tubular extension 106 and bears directly thereon. Thus, the coupling element 58 is dislocatably guided axially along the tubular section 132. In this case, a frictional engagement can also be provided between these elements or alternatively frictionless play.

The functioning of the arrangement from FIG. 13 corresponds essentially to that of the fifth and sixth embodiments described above. Accordingly, on exertion of an actuating force F, firstly the coupling element 58 is commonly dislocated with the piston 16 over a distance x and in the process also displaces a position detection rod 70. After travelling the distance x, the annular section 62 of the coupling element 58 comes into abutment with an end surface 112 of the brake cylinder housing 12, so that the piston 16 is further dislocated relative to the stationary coupling element 58. In the process, the holding bush 136 moves through the tubular extension 106 under a compression of the compression spring 116. On the return movement of the piston 16 to the initial position shown in FIG. 13, this piston once again comes into abutment with the bottom 110 of the coupling element 58, so that the latter is moved back to its initial position under additional action of the return force of the compression spring 116.

In accordance with the provisions of the patent statutes, the principle and mode of operation of this invention have been explained and illustrated in its preferred embodiment. However, it must be understood that this invention may be practiced otherwise than as specifically explained and illustrated without departing from its spirit or scope.

The invention claimed is:

1. A master brake cylinder arrangement with actuation detection for a motor vehicle braking system with at least one piston arrangement with a piston which is dislocatably guided in a cylinder bore in a cylinder housing, wherein the piston confines a pressure chamber with the cylinder bore which is fluidically coupled with a hydraulic brake circuit, and can be dislocated during a forward stroke from an initial position toward an actuated position along a dislocation axis which substantially coincides with a longitudinal axis of the cylinder bore, and is dislocated from the actuated position to the initial position during a back stroke, wherein a coupling element is assigned to the piston which is coupled for a common dislocation to a position detection rod which is dislocatably guided substantially in parallel to the first cylinder bore, wherein the position of the position detection rod is detectable with a position detection sensor attached to the cylinder housing,
wherein the coupling element is lockable relative to the piston for a common stroke movement with the latter and after over-travelling of a predetermined distance of the stroke movement, the piston is further dislocatable relative to the coupling element.

2. The master brake cylinder arrangement according to claim 1,
wherein the coupling element is assigned a first abutment surface of the piston, of the cylinder housing or of a component coupled thereto, against which surface the coupling element in the initial position abuts or is supported.

3. The master brake cylinder arrangement according to claim 2,
wherein the coupling element is assigned a second abutment surface of the piston, of the cylinder housing or of a component coupled thereto, against which surface the coupling element abuts on over-travelling of the predetermined distance of the stroke movement.

4. Master brake cylinder arrangement according to claim 3,
wherein the first or the second abutment surface is part of an integrally formed section of the cylinder housing.

5. Master brake cylinder arrangement according to claim 3,
wherein the first or the second abutment surface is provided on an additional element formed in the cylinder housing, wherein the additional element is configured in the form of a disc surrounding the piston in the circumferential direction, of an annular sealing component or of an annular closure element.

6. Master brake cylinder arrangement according to claim 5,
wherein the coupling element has an abutment ring which is provided with an abutment surface, via which it engages on the piston.

7. Master brake cylinder arrangement according to claim 1,
wherein the coupling element is a body at least partially encompassing the piston in the circumferential direction.

8. Master brake cylinder arrangement according to claim 7,
wherein the coupling element abuts against the piston under radial bias and is coupled to the piston by frictional engagement, wherein the abutment surface is provided with a friction lining.

9. Master brake cylinder arrangement according to claim 1,
wherein the coupling element is coupled via a spring element for common movement with the piston.

10. Master brake cylinder arrangement according to claim 9,
wherein the coupling element is biased via the spring element into an initial position relative to the piston.

11. Master brake cylinder arrangement according to claim 10,
wherein the coupling element has a stop ring, with which it can be brought, owing to the stroke movement of the piston, into abutment against the cylinder housing on over-travelling of the predetermined distance of the stroke movement, wherein the coupling element on advancing stroke movement of the piston, under the action of the spring element, remains stationary relative to the cylinder housing.

12. Master brake cylinder arrangement according to claim 9, wherein the spring element is supported, at one end, on the coupling element and, at the other end, on a holding bush fixed to the piston or a closure element fixed to the cylinder housing.

13. Master brake cylinder arrangement according to claim 12, wherein the holding bush is formed as a separate component and fixed to the piston.

14. Master brake cylinder arrangement according to claim 1, wherein the guide shaft is configured with a diameter step, wherein the position detection rod has a smaller-diameter detection section, on which a sensor element is provided.

15. Master brake cylinder arrangement according to claim 1, wherein the sensor element has a magnetic body and in that the position detection sensor is a Hall sensor.

* * * * *